United States Patent Office 3,776,856
Patented Dec. 4, 1973

3,776,856
PROCESS FOR THE WET CHEMICAL COMBUSTION OF ORGANIC MATERIAL
Knut Scheffler, Karlsruhe, and Hendricus M. Muller and Aldo Cappel, Hanau am Main, Germany, assignors to Alkem, Alpha-Chemie und- Metallurgie G.m.b.H., Leopoldshafen uber Karlsruhe, Germany
No Drawing. Filed Nov. 23, 1970, Ser. No. 92,196
Claims priority, application Germany, Nov. 21, 1969,
P 19 58 464.6
Int. Cl. C01g 56/00
U.S. Cl. 252—301.1 W                    18 Claims

ABSTRACT OF THE DISCLOSURE

The wet chemical combustion of organic materials, e.g. animal cadavers, cellulose, cellulose containing materials and other organic waste with subsequent separation and recovery of heavy metals, especially plutonium and uranium, contained therein by carbonizing the organic material with highly concentrated mineral acids at elevated temperature and combusting the colloidal carbon obtained with active oxygen to form carbon dioxide.

---

The object of the invention is to develop a process for the wet chemical combustion of organic materials such as animal cadavers, cellulose, cellulose containing materials and other organic waste with the subsequent separation and recovery of the heavy metals of the actinide series, particularly plutonium and uranium contained therein.

Such wastes accumulate for example in the processing of plutonium and uranium compounds in which absorbent paper or cellulose is used for the purification of contaminated materials and in the wiping up of spilled material, whether it be in solid or liquid form.

In order to reduce the volume it is appropriate to burn these wastes and to extract the metal from the ashes. In industrial practice, however, until now there has not been solved satisfactorily the problem of decontamination.

On account of the toxicity and $\alpha$-activity of plutonium, all working up steps must, for example be carried out in glove boxes in order to avoid endangering the environment. From this there appears, among others, the following requirements in the working up process:

(1) There should be formed as small as possible amounts of gas.
(2) The waste gas should be free of solid suspended material.
(3) There should be set free as little heat as possible.

According to known experience these requirements were fulfilled to only a small extent in dry burning. By the process of the present invention, however, they are extensively fulfilled.

There have been proposed many methods to decompose paper or chemically equivalent products in the wet way. In most cases, however, the following requirements, which must be supplied in a wet chemical combustion, are not fulfilled:

(1) It should be possible to recover the radioactive heavy metals in a simple manner from the reaction mixture.
(2) The consumption of chemicals should be kept within an economical frame.
(3) No harmful byproducts can be formed.
(4) The volume of residue must be considerably less than the volume of the waste to be burned.

For example, use has been found for the wet combustion according to Kjeldahl, in which the combustion of organic materials to carbon dioxide takes place by boiling concentrated sulfuric acid at about 330° C. with, for example, selenium as catalyst, in the removal of poisonous, radioactive waste.

The great disadvantages of this process are the development of sulfur dioxide which on hygienic grounds must be completely converted to sulfuric acid, a problem which is more expensive than the combustion itself, and the high temperature, which means a hardly solvable industrial material problem.

There are found in the literature numerous methods for the combustion of graphite which, by suitable modification can be made to apply to colloidal graphite. In such procedures reference is made throughout to strong oxidizing acids, which, at suitable temperature and pressures, and for the most part first by catalysis through foreign metal compounds convert carbon into carbon dioxide.

For example, there can be used $HClO_4$ with $CrO_3$, or $H_2SO_4$ with $CrO_3$ and $MnSO_4$, or $K_2Cr_2O_7$ in $H_3PO_4$.

Through the introduction of these foreign metals, as well as the great difficulty in extracting the heavy metal and the reclaiming of the added chemicals such methods of operation are afflicted with substantial disadvantages.

It is known that numerous organic substances can be ashed with Fenton's reagent, an aqueous solution of $H_2O_2$/$Fe^{++}$. This method, especially for analytical purposes, offers large advantages. However, it possesses the disadvantage that cellulose is only slowly decomposed and that, in the case of biological material, fat is not decomposed. Also there may be difficulty to extend this method to a continuous industrial process.

By exhaustive investigation it has now, surprisingly, turned out that organic materials such as animal cadavers, cellulose and cellulose containing materials and other organic substances can be combusted in a wet chemical manner if the material is carbonized with highly concentrated strong or moderately strong mineral acids at elevated temperature, e.g. 20 to 200° C. and the colloidal carbon formed thereby, in a given case at elevated temperature, e.g. 100 to 200° C. oxidized by active oxygen to carbon dioxide. As mineral acids there can be used, sulfuric acid and phosphoric acid.

Preferably the material is carbonized at a temperature of 100 to 200° C. in highly concentrated, e.g. 80 to 90% concentration at 120–200° C., preferably 150 to 160° C. phosphoric acid or sulfuric acid, e.g. 96 to 99% concentration at 160 to 200° C., preferably 180° C. and subsequently oxidized at the same temperature by addition of 30 to 70% hydrogen peroxide solution. In place of hydrogen peroxide there can be used electrolysis or ozone as the source of active oxygen.

There results consequently by the combination of two process steps known in themselves a method which is free of the above mentioned disadvantages. The carbonization and combustion proceed, for example, in phosphoric acid so quickly that the process can be carried out continuously. The supply of heat energy can be so regulated that the water formed from the paper (and other organic material) and the $H_2O_2$ as well as the water added with the $H_2O_2$ can be distilled off continuously so that it is not necessary, at least with phosphoric acid, periodically to interrupt the operation to concentrate the acid. The acid is then first withdrawn from the apparatus when so much heavy metal has collected in it that extraction or precipitation of this becomes necessary.

The invention not only shows great advantages over other methods of wet combustion but also possesses favorable industrial process properties.

In regard to apparatus the process is simple to carry out. The decomposition proceeds quickly so that good throughput is possible. The temperature is relatively so low that several industrial materials are fit for the apparatus. The method is suited for a continuous process. The efficiency of the hydrogen peroxide is 85% or better while the acid generally is not used up. Excluding the concentrating of the sulfuric acid there is no need to regenerate or work up chemicals, sulfur dioxide is not formed, the byproducts are carbon dioxide and water. Besides the decontamination factor is so high that an uncomplicated waste gas treatment is sufficient.

The invention will be further illustrated in the following examples.

Unless otherwise indicated all parts and percentages are by weight.

EXAMPLE 1

400 grams of cellulose contaminated with plutonium and uranium were put in 5 liters of concentrated sulfuric acid with stirring. The mixture was heated to 120° C., subsequently a reaction lasted for 10 minutes. Then there were added over a half hour with stirring 1.2 liters of 70% hydrogen peroxide, which was 115% of the calculated amount based on $CO_2$, at which the temperature was held to about 180° C. by cooling. A clear, colorless solution was obtained. Finally the acid was again concentrated by distillation of the water at 200° C. and 18 torr. (Distillation can also be carried out at 2 to 200 torr at 150 to 250° C.)

EXAMPLE 2

5 liters of 85% phosphoric acid was heated to 160° C. and held at about this temperature during the entire process regulated by heating. Within an hour there were simultaneously added 1 kilogram of cellulose contaminated with plutonium and uranium and 3 liters of 70% hydrogen peroxide. A clear solution was obtained. The water formed by addition of the hydrogen peroxide and carbonization of the cellulose was distilled off during the process. (In place of 70% hydrogen peroxide there can be used the equivalent amount of 30% hydrogen peroxide.)

The addition of hydrogen peroxide can be eliminated if the active oxygen necessary for the oxidation of the carbon is produced electrolytically, e.g. by employing platinum electrodes at a potential difference of 3 volts. For the oxidation of 1 kilogram of cellulose carbonized in 85% phosphoric acid at 160° C. there are needed 5000 ampere hours, which corresponds to a current yield of about 70% of theory based on the carbon dioxides.

EXAMPLE 3

The carcass of a 14 gram mouse containing small amounts of plutonium and uranium was put into one-half liter of cold 85% phosphoric without any comminution. The acid was heated to 160° C. At 120° C. brisk decomposition began. After one half hour a dark, turbid solution was formed which became clear and yellow by addition of 10 ml. of 70% hydrogen peroxide. The solution was held at 160° C. and later darkened by carbonization of organic fragments. After addition of a further 50 ml. of hydrogen peroxide the solution was free of organic constituents and remained nearly colorless to slightly brown.

The process can be carried out continuously using sulfuric acid if the three steps, i.e. carbonization of the organic material, combustion and concentration of the sulfuric acid are carried out in three separate vessels connected in series. Thus the process of Example 1 can be carried out continuously using such an apparatus.

The electrolytic process for production of nascent oxygen to convert the colloidal carbon to carbon dioxide likewise can be carried out continuously using phosphoric (or sulfuric acid if three vessels are employed).

When sufficient plutonium and/or uranium compound accumulates in the acid it can be recovered in any desirable manner, e.g. by precipitation or extraction with suitable organic reagents, like tributylphosphate.

What is claimed is:

1. A process for the wet, chemical combustion of carbohydrate containing organic material contaminated with a radioactive element of the actinide series comprising carbonizing the carbohydrate containing organic material with sulfuric acid or phosphoric acid at elevated temperature and subjecting the colloidal carbon formed to combustion at elevated temperature to carbon dioxide with active oxygen.

2. A process according to claim 1 wherein the organic material comprises cellulose.

3. A process according to claim 1 wherein the carbonization of the organic material and the combustion of the carbon is carried out in highly concentrated phosphoric acid at 120 to 200° C.

4. A process according to claim 3 carried out at 150 to 160° C.

5. A process according to claim 1 wherein the carbonization of the organic material and the combustion of the carbon is carried out in highly concentrated sulfuric acid at 160 to 200° C.

6. A process according to claim 5 is carried out at 180° C.

7. A process according to claim 1 wherein the combustion of the carbon is carried out with 30 to 70% hydrogen peroxide.

8. A process according to claim 7 wherein the hydrogen peroxide concentration is 70%.

9. A process according to claim 1 wherein the acid is phosphoric acid and the carbonization and combustion of the organic materials are carried out simultaneously and continuously in a reactor in which organic material and hydrogen peroxide are continuously put into the acid and the water occurring is distilled off.

10. A process according to claim 1 wherein the acid is phosphoric acid and the carbonization and combustion of the organic material take place simultaneously and continuously while continuously waste organic material is put into the acid and an electric current is led into the acid to form nascent oxygen and the water occurring is distilled off.

11. A process according to claim 1 wherein the acid is phosphoric acid of 80–90% concentration.

12. A process according to claim 1 wherein the acid is sulfuric acid of 96–99% concentration.

13. A process according to claim 12 wherein the sulfuric acid is concentrated and the carbonization, combustion and concentration are carried out continuously in three separated vessels connected in series.

14. A process according to claim 1 wherein the organic material is an animal body.

15. A process according to claim 1 wherein the carbonizing is carried out at 20 to 200° C. and the combustion is at 100 to 200° C.

16. A process according to claim 1 wherein the radioactive element is plutonium or uranium.

17. A process according to claim 16 wherein the carbonizing is carried out at 20 to 200° C. and the combustion is at 100 to 200° C.

18. A process according to claim 16 wherein the organic material comprises cellulose.

References Cited

UNITED STATES PATENTS

| | | | |
|---|---|---|---|
| 2,067,985 | 1/1937 | Sargent | 23—209.1 |
| 2,083,303 | 6/1937 | Krczil | 252—422 X |
| 2,722,547 | 11/1955 | Toland | 23—150 X |
| 2,690,425 | 9/1954 | Moses et al. | 23—150 X |
| 1,319,515 | 10/1919 | Danks | 23—150 |
| 3,248,303 | 4/1966 | Doying | 252—422 X |
| 2,580,647 | 1/1952 | Bielawski | 252—423 |
| 2,216,756 | 10/1940 | Scheffler | 252—423 |

CARL D. QUARFORTH, Primary Examiner

R. L. TATE, Assistant Examiner

U.S. Cl. X.R.

252—301.1 R, 422, 423; 424—3, 437